United States Patent
Ozaki et al.

(12)

(10) Patent No.: US 6,476,881 B2
(45) Date of Patent: Nov. 5, 2002

(54) LIQUID CRYSTAL DISPLAY DEVICE AND DEFECT REPAIRING METHOD THEREFOR

(75) Inventors: Kiyoshi Ozaki; Kouji Tsukao; Satoru Kawai, all of Yonago (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 09/778,134

(22) Filed: Feb. 6, 2001

(65) Prior Publication Data

US 2001/0028417 A1 Oct. 11, 2001

(30) Foreign Application Priority Data

Mar. 29, 2000 (JP) ........................................ 2000-092347

(51) Int. Cl.[7] .............................................. G02F 1/136
(52) U.S. Cl. ............................ 349/43; 349/38; 349/39; 349/42; 349/192
(58) Field of Search .......................... 349/192, 38, 39, 349/42, 43

(56) References Cited

U.S. PATENT DOCUMENTS 6,307,602 B1 * 10/2001 Song ............................ 349/38

FOREIGN PATENT DOCUMENTS

JP    2-310537    12/1990

* cited by examiner

*Primary Examiner*—Kenneth Parker
*Assistant Examiner*—David Chung
(74) *Attorney, Agent, or Firm*—Greer, Burns & Crain, Ltd.

(57) ABSTRACT

To provide a liquid crystal display device which allows disconnection defects caused in the manufacturing process to be readily repaired with a higher success rate than conventional cases so that the device can be modified into a non-defective device, and a defect repairing method therefor. In a liquid crystal display device having a lead-out portion provided at a lowermost layer bus line 1 formed on a transparent insulating substrate 6, and a pixel electrode layer 3 formed on the lead-out portion through insulating layers 2, 4, an independent intermediate conductive layer 5 is formed between the lead-out portion and said pixel electrode layer 3.

5 Claims, 14 Drawing Sheets

LIQUID CRYSTAL DISPLAY DEVICE AND DEFECT REPAIRING METHOD THEREFOR

BACKGROUND OF THE INVENTION

1. Field of the Invention

The present invention relates to a liquid crystal display device and a defect repairing method therefor, and more specifically, to a liquid crystal display device which allows disconnection defects caused in the process of manufacturing the liquid crystal display device to be readily repaired with a higher success rate than conventional cases, so that the device can be modified into a non-defective device, and a defect repairing method therefor.

2. Description of the Related Art

Active matrix type liquid crystal display devices used as a display device in OA-related equipment including computers have attracted attention as a high picture quality flat panel display. The liquid crystal display device has a redundant structure which can repair disconnection defects caused in the manufacturing process, in order to increase the manufacturing yield. The general structure of a conventional liquid crystal display device will be now described in conjunction with FIGS. 27 to 29.

FIG. 27 is a view of the surface of an array substrate for a liquid crystal display panel in a conventional liquid crystal display device, viewed from the liquid crystal layer side. As shown in FIG. 27, a plurality of data bus lines (drain bus lines) 11a, 11b, 11c, etc. extending in the vertical direction in the figure are formed on the substrate. A plurality of gate bus lines 13a, 13b, etc. denoted by the broken line extending in the horizontal direction in the figure are also formed on the substrate. Pixels are formed in regions defined by these data bus lines 11a, 11b, 11c and the gate bus lines 13a, 13b. In the vicinity of crossing positions of the data bus lines 11a, 11b, 11c and the like and the gate bus lines 13a, 13b and the like, TFTs 15a, 15b, etc. are formed.

For example, in the case of the TFTs 15a and 15b as shown in the upper part of the figure, drain electrodes 17a, 17b are led out from the data bus lines 11a, 11b shown at the left of the TFTs 15a, 15b, and their ends are formed to be positioned on one end side on channel protection films 19a, 19b formed on the gate bus line 13a.

Meanwhile, source electrodes 21a, 21b are formed to be positioned on the other end side on the channel protection films 19a, 19b. In this structure, the region of the gate bus line 13a immediately under the channel protection films 19a, 19b serves as a gate electrode for these TFTs 15a, 15b. Although not shown, a gate insulating film is formed on the gate bus lines 13a, 13b, on which an active semiconductor layer forming a channel is formed. In the TFT structure as shown in FIG. 27, gate electrodes are not formed in the manner in which they are led out from the gate bus lines 13a, 13b, but a part of the linearly provided gate bus lines 13a, 13b is each used as a gate electrode.

A storage capacitor bus line 23 is formed in the region denoted by the broken line extending in the horizontal direction virtually in the center of the pixel region. Storage capacitor electrodes 25a, 25b are formed for each pixel at an over layer of the storage capacitor bus line 23 through an insulating film. Pixel electrodes 27a, 27b of a transparent electrode material are formed at an over layer of the source electrodes 21a, 21b and the storage capacitor electrodes 25a, 25b through a protection film. The pixel electrodes 27a, 27b are electrically connected with the source electrodes 21a, 21b through contact holes 29a, 29b provided in a protection film formed at the under layer. The pixel electrodes 27a, 27b are also electrically connected with the storage capacitor electrodes 25a, 25b through contact holes 31a, 31b.

The TFT described above has an inverted staggered structure, while there are thin film transistors having other structures such as a staggered type or planar type structure having a drain electrode at the lowermost layer for example and a gate electrode at an over layer of thereof. In any of these structures, each metal layer is placed through an insulating film.

Each of the gate bus lines 13 has lead-out portions 33a, 33b, etc. led out into the pixels perpendicularly to the extending direction of the bus line. The lead-out portion 33b for example has a region overlapping the pixel electrode 27b at the upper right part of the pixel when viewed in the normal direction to the panel surface. FIG. 28 shows a section of the lead-out portion 33a taken along line E–E' in FIG. 27. As shown in FIG. 28, the gate bus line 13a is formed on a glass substrate 35. The lead-out portion 33b is formed as it is led out to the side of the gate bus line 13a. A gate insulating film 37 is formed immediately on the gate bus line 13a, and the pixel electrode 27b is formed on the lead-out portion 33b through a protection film 39.

For example, as shown in FIG. 27 in the upper right part, when the gate bus line 13a is disconnected at a disconnection portion 41, the defect is repaired as follows. More specifically, the disconnection portion 41 is located between the TFT 15b and the data bus line 11c, and therefore a laser beam is irradiated upon a laser irradiation position 43 shown at the upper right corner of the pixel electrode 27b. The irradiation energy of the laser beam causes the pixel electrode 27b and the metal forming the lead-out portion 33b immediately below to be melted, connected and short-circuited. Thus, the right end of the disconnection portion 41 of the gate bus line 13a is electrically connected with the pixel electrode 27b through the lead-out portion 33b.

Similarly, a laser beam is irradiated upon laser irradiation positions 45 on the side of the source electrode 21b of the TFT 15b to short-circuit the source electrode 21b and the left end of the disconnection portion 41 of the gate bus line 13a. A laser beam is also irradiated upon a laser irradiation position 47 shown on the proximal side of the data bus line 11b to electrically isolate the drain electrode 17b from the data bus line 11b. Thus, the disconnection portion 41 of the gate bus line 13a is short-circuited by the pixel electrode 27b and the disconnection defect is repaired.

According to the above-described defect repairing method, the repair success ratio can hardly be increased.

FIG. 29 is a sectional view of the device when a laser beam is irradiated upon the laser beam irradiation position 43 shown in FIG. 27. The distance d between the lower layer gate bus line 13a and the upper layer pixel electrode 27b is for example as thick as 800 nm. Therefore, as shown in FIG. 29, if the metal forming the lower layer gate bus line 13a as thick as 100 nm for example melts with the irradiation of a laser beam 49, only a small area is short-circuited with the upper layer pixel electrode 27b, and sometimes almost no short circuit is formed.

In order to reduce the manufacturing cost, it is strongly desirable to improve the manufacturing yield. As one means therefor, there is a strong demand to increase the repair success rate for repairing defect portions.

SUMMARY OF THE INVENTION

It is an object of the present invention to provide a liquid crystal display device which allows disconnection defects caused in the manufacturing process to be readily repaired with a higher success rate than conventional cases so that the device can be modified into a non-defective device, and a defect repairing method therefor.

The above-described object is achieved by a liquid crystal display device including a lead-out portion led out from a bus line formed on a substrate and extending at an under layer of a pixel electrode through an insulating film, and an isolated intermediate conductive layer formed in the insulating film between said lead-out portion and said pixel electrode.

According to the present invention, the thickness of the insulating film between the bus line and the pixel electrode is divided by the intermediate conductive layer. Therefore, a short-circuit interval by laser beam irradiation is reduced as compared to the conventional case and a repair success rate is improved.

DESCRIPTION OF THE PREFERRED EMBODIMENTS

Figure 28:
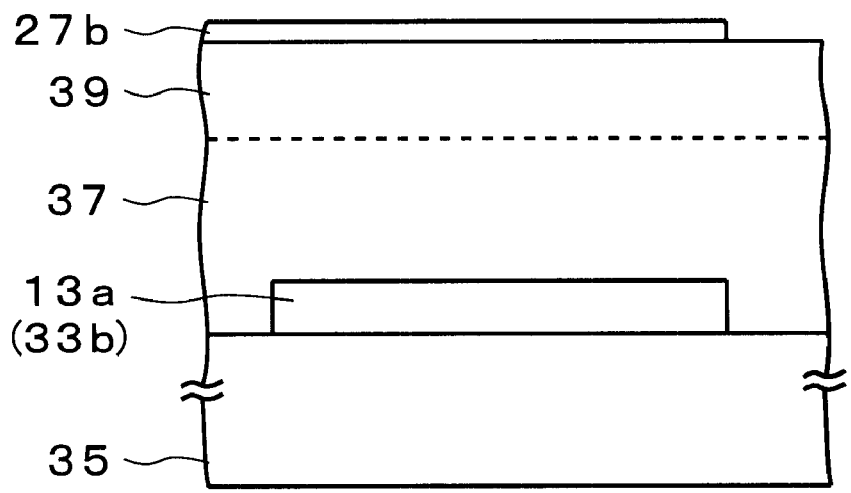
FIG. 28 is a sectional view taken along line E–E' in FIG. 27.
Figure 29:
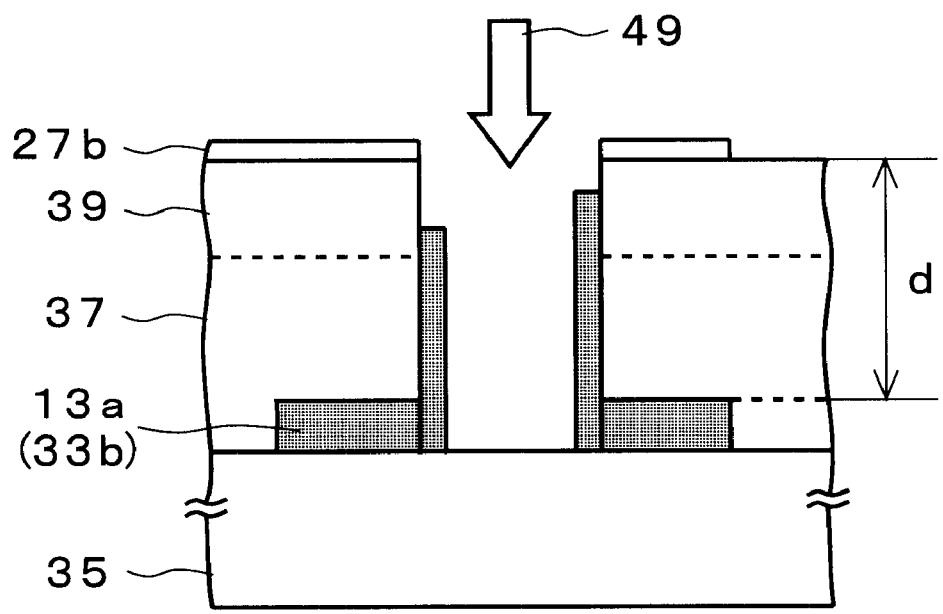
FIG. 29 is a sectional view for use in illustration of how a laser beam is irradiated in a conventional defect repairing method.

Liquid crystal display devices and defect repairing methods therefor according to first to third embodiments of the present invention will be now described in conjunction with FIGS. 1 to 26. Note that the elements having the same functions and effects as those shown in FIGS. 27 to 29 described in connection with the conventional devices are denoted with the same reference characters and will not be detailed.

Figure 1:
FIG. 1 is a sectional view for use in illustration of a method of repairing a defect in a liquid crystal display device according to a first embodiment of the present invention.

A liquid crystal display device and a defect repairing method therefor according to the first embodiment of the present invention will be now described in conjunction with FIGS. 1 to 18. FIG. 1 is a sectional view for use in illustration of the method of repairing a defect in the liquid crystal display device according to the embodiment. As described above, in the TFT structures, there are staggered type and planar type structures other than the inverted staggered structure. In the staggered or planar type structure, a drain electrode is present in the lowermost layer, and a gate electrode is at the over layer portion, conversely to the inverted staggered type structure.

Therefore, in FIG. 1, a lowermost layer bus line 1 formed first at a transparent insulating substrate (glass substrate) 6 corresponds to the gate bus line (and storage capacitor bus line) in the inverted staggered type TFT structure, while it corresponds to the drain bus line (data bus line) in the staggered or planar type structure.

Figure 27:
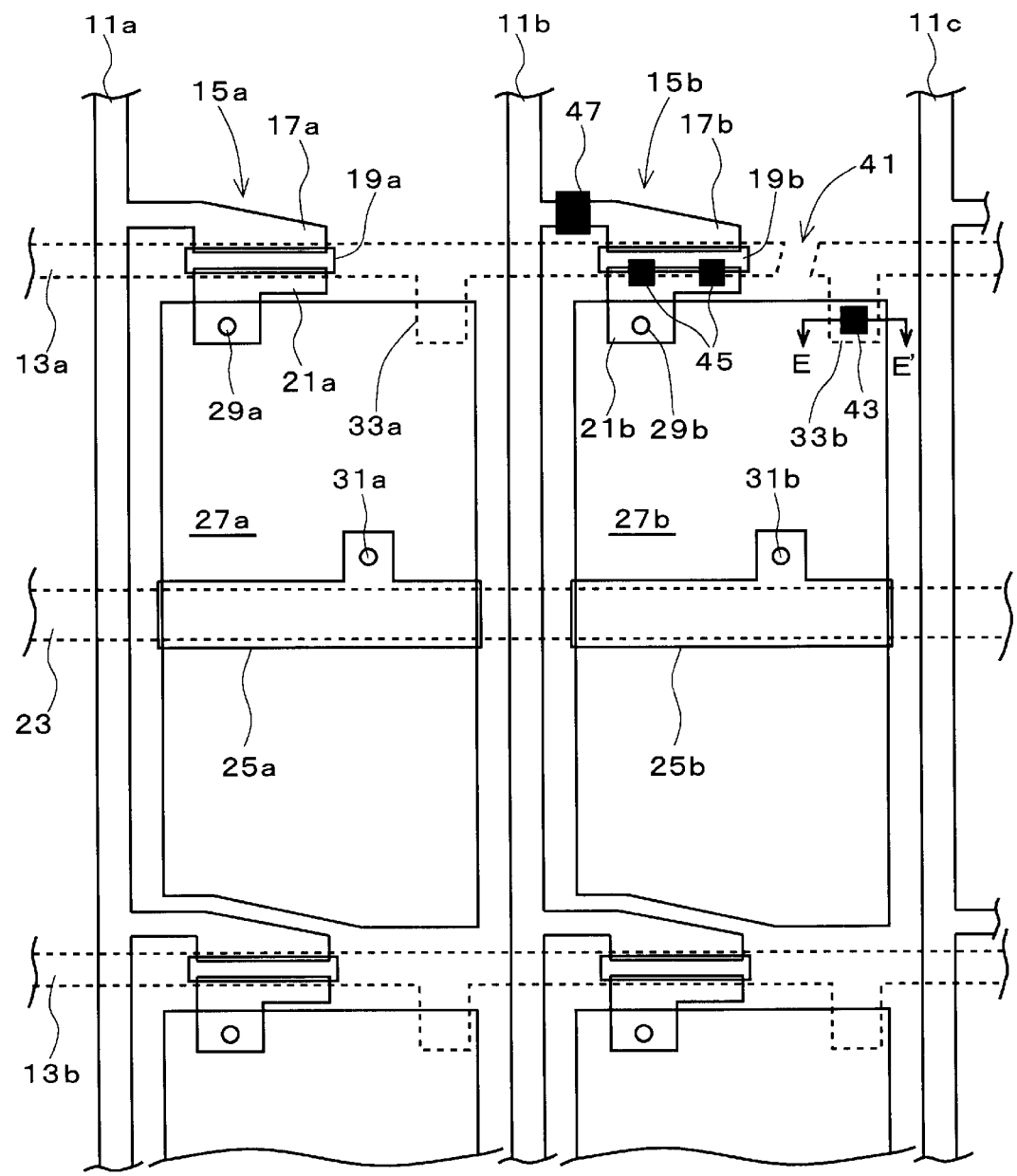
FIG. 27 is a plan view showing the structure of a conventional liquid crystal display device.

In the lowermost layer bus line 1, a lead-out portion (33a, 33b) as shown in FIG. 27 is formed as it is led out to the side portion. The formation position of the lead-out portion is at the laser irradiation position. A pixel electrode 3 is formed at the upper part of the lead-out portion led out to the side portion of the lowermost bus line 1 through insulating layers 2 and 4. According to the embodiment, an intermediate conductive layer 5 isolated as an intermediate layer is provided between the insulating layers 2 and 4 at a position immediately above the lead-out portion. The intermediate conductive layer 5 is formed of a metal film or a metal oxide film. The thickness is in the range from 50 nm to 200 nm.

The depth of the insulating films 2, 4 between the lowermost bus line 1 and the pixel electrode 3 should be considered at the time of laser irradiation in the conventional case, while by the use of this intermediate conductive layer 5, the depth to be considered may be two spaces, i.e., spaces between the lowermost bus line 1 and the intermediate conductive layer 5 and between the intermediate conductive layer 5 and the pixel electrode 3, and therefore the depth can be shorter than the conventional case. Therefore, a short circuit may be readily and surely formed with the irradiation energy which is not much intensive, so that the repair success rate can be raised as compared to the conventional case.

As a specific method of short-circuiting, there may be two methods as shown in FIGS. 2A and 2B or FIGS. 3A and 3B. FIGS. 2A to 3B are sectional views for use in illustration of the first and second methods of laser irradiation used in the method of repairing a defect in the liquid crystal display device according to the embodiment.

Figure 2A:
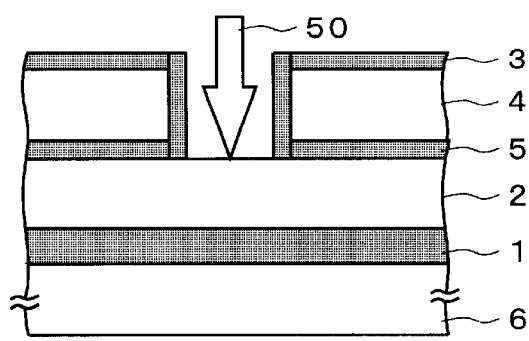
FIGS. 2A and 2B are sectional views for use in illustration of a first method of laser irradiation used in the method of repairing a defect in the liquid crystal display device according to the first embodiment of the present invention.
Figure 2B:
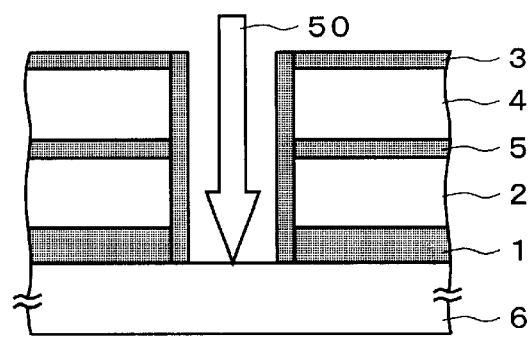

As shown in FIG. 2A, a laser beam 50 is irradiated to short-circuit the upper layer pixel electrode 3 and the intermediate conductive layer 5. Then, as shown in FIG. 2B, a laser beam 50 having the same slit width is irradiated to short-circuit the intermediate conductive layer 5 which is short-circuited with the pixel electrode 3 also with the lowermost bus line 1.

Figure 3A:
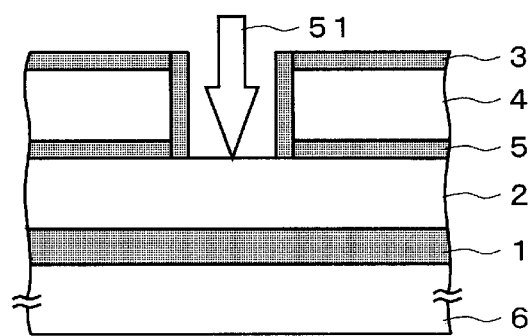
FIGS. 3A and 3B are sectional views for use in illustration of a second method of laser irradiation used in the method of repairing a defect in the liquid crystal display device according to the first embodiment of the present invention.
Figure 3B:
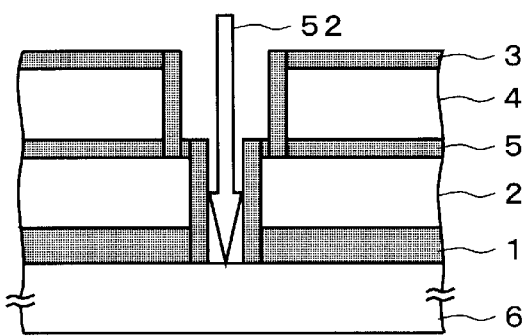

Also as shown in FIG. 3A, a laser beam 51 is irradiated to short-circuit the upper layer pixel electrode 3 and the intermediate conductive layer 5. Then, as shown in FIG. 3B, a laser beam 52 having a narrower silt width is irradiated to short-circuit the lowermost bus line 1 and the intermediate conductive layer 5. Thus, the pixel electrode 3 and the intermediate conductive layer 5, and the lowermost bus line 1 and the intermediate conductive layer 5 are connected in a divided manner. In this manner, the repair success rate may be further increased. Note that the slit widths formed by the irradiation of the laser beams 50 and 51 are suitably in the range from 2 to 13 $\mu$m in consideration of the pattern size or the like.

An inverted staggered type TFT liquid crystal display device according to this embodiment and a manufacturing method thereof will be now described with reference to examples in conjunction with FIGS. 4 to 18. Note that FIGS. 4 to 10B relate to example 1, FIGS. 11 to 17B relate to example 2, and FIG. 18 relates to example 3.

EXAMPLE 1

Figure 4:
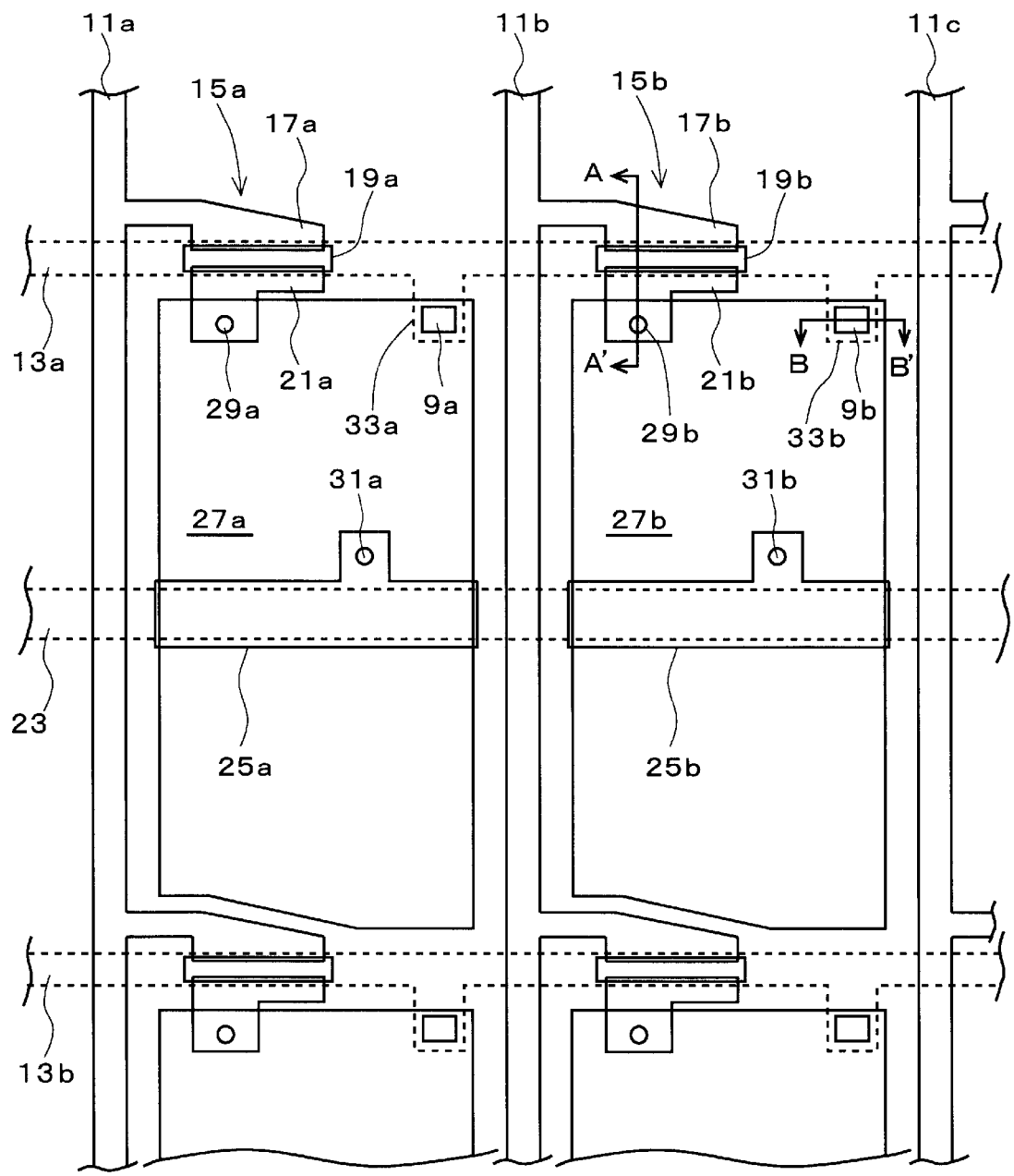
FIG. 4 is a plan view showing a liquid crystal display device (example 1) according to the first embodiment of the present invention.

FIG. 4 is a plan view showing a liquid crystal display device according to example 1. FIG. 4 shows the surface of an array substrate viewed from the liquid crystal layer side. As shown in FIG. 4, intermediate conductive layers 9a, 9b are provided in respective overlapping regions of lead-out portions 33a, 33b and pixel electrodes 27a, 27b. The intermediate conductive layers 9a, 9b are formed as shown in FIGS. 5A to 10B.

FIGS. 5A to 10B are sectional views showing steps in a method of manufacturing the liquid crystal display device according to this example. Note that in FIGS. 5A to 10B, the same elements as those shown in FIG. 4 are denoted with the same reference characters. FIGS. 5A, 6A, 7A, 8A, 9A and 10A show sections of a TFT 15b taken along line A–A' in FIG. 4, while FIGS. 5B, 6B, 7B, 8B, 9B and 10B show sections of a region including the intermediate conductive layer 9b taken along line B–B' in FIG. 4.

Figure 5A:
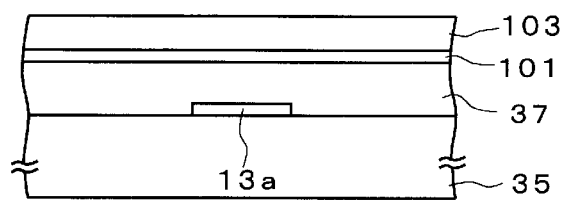
FIGS. 5A and 5B are sectional views showing steps in a method of manufacturing the liquid crystal display device (example 1) according to the first embodiment of the present invention.
Figure 5B:
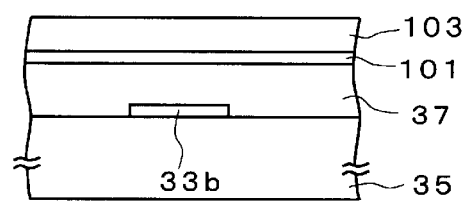
Figure 6A:
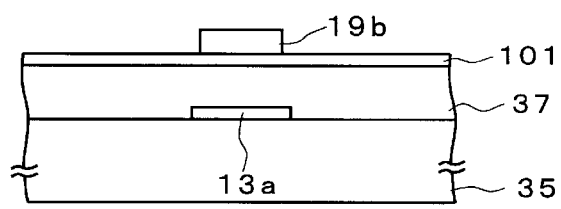
FIGS. 6A and 6B are sectional views showing steps in the method of manufacturing the liquid crystal display device (example 1) according to the first embodiment of the present invention.
Figure 6B:
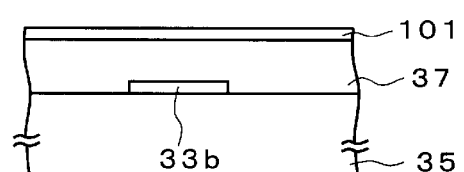

As shown in FIGS. 5A and 5B, an Al (aluminum) film for example is formed on the whole surface of a transparent glass substrate 35 to form a metal layer about as thick as 150 nm. Then, using a first mask, patterning is performed to form a gate bus line 13a (see FIG. 5A) and a lead-out portion 33b (see FIG. 5B). Then, for example, a silicon nitride (SiN) film is formed on the whole surface of the substrate by plasma CVD to form a gate insulating film 37. Then, for example, an amorphous silicon (a-Si) layer 101 to form an active semiconductor film is formed on the whole surface of the substrate by plasma CVD. Furthermore, a silicon nitride (SiN) film 103 for example to form a channel protection film is formed on the whole surface by plasma CVD.

Using the gate bus line 13a and the lead-out portion 33b as masks, the transparent glass substrate 35 is subjected to back exposure, and a resist pattern (not shown) is formed on the gate bus line 13b in a self-aligned manner. Then, using a second mask, the resist pattern on the gate bus line 13b is further patterned. Using the resist pattern as an etching mask, the silicon nitride film 103 formed on the gate bus line 13a is etched to form a channel protection film 19b on the gate bus line 13a in the region to form the TFT 15b (see FIGS. 6A and 6B).

Figure 7A:
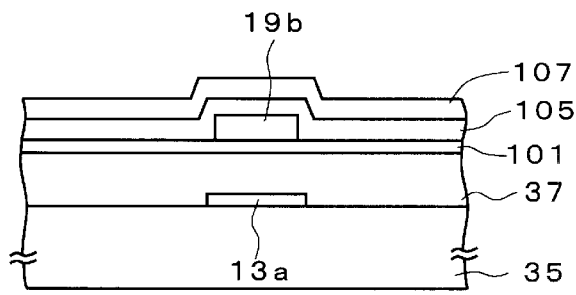
FIGS. 7A and 7B are sectional views showing steps in the method of manufacturing the liquid crystal display device (example 1) according to the first embodiment of the present invention.
Figure 7B:
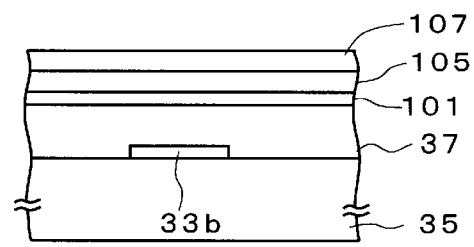

Then, as shown in FIGS. 7A and 7B, an $n^{30}$ a-Si layer 105 to form an ohmic contact layer is formed on the whole surface by plasma CVD. A metal (such as Cr) layer 107 to form a drain electrode 17b, a source electrode 21b, a storage capacitor electrode 25b, a data bus line 11b and an intermediate conductive layer 9b is formed by sputtering.

Figure 8A:
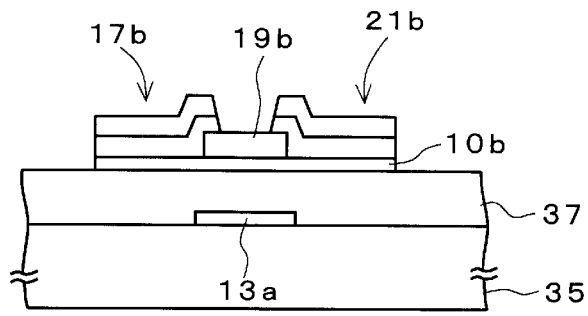
FIG. 8A and 8B are sectional views showing steps in the method of manufacturing the liquid crystal display device (example 1) according to the first embodiment of the present invention.
Figure 8B:
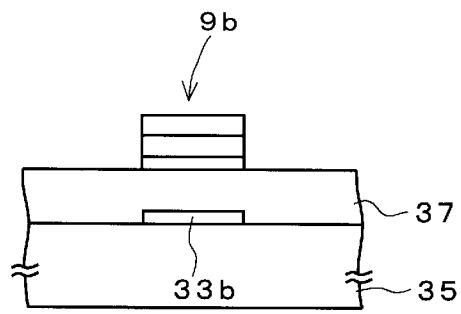

Using a third mask, as shown in FIGS. 8A and 8B, the metal layer 107, the $n^+$a-Si layer 105, and the amorphous silicon layer 101 are patterned to form a data bus line 11b (not shown in FIGS. 8A and 8B), the drain electrode 17b, the source electrode 21b, the intermediate conductive layer 9b and the active semiconductor layer 109. In the etching processing during the pattering, the channel protection film 19b serves as an etching stopper, while the underlying amorphous silicon layer 101 is not etched and remains.

Figure 9A:
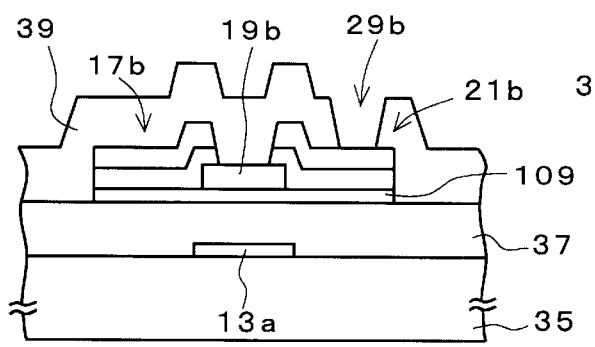
FIGS. 9A and 9B are sectional views showing steps in the method of manufacturing the liquid crystal display device (example 1) according to the first embodiment of the present invention.
Figure 9B:
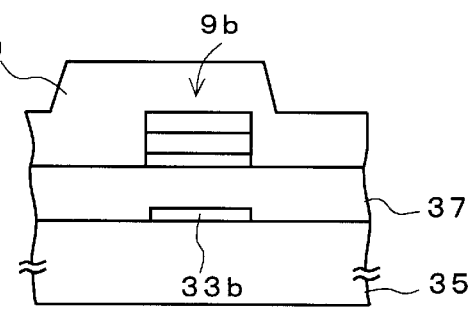

Subsequently, as shown in FIGS. 9A and 9B, a protection film 39 of a silicon nitride film for example is formed by plasma CVD. Then, using a fourth mask, the protection film 39 is patterned to form an opening in the protection film 39 on the source electrode 21b, and a contact hole 29b is formed on the source electrode 21b.

Figure 10A:
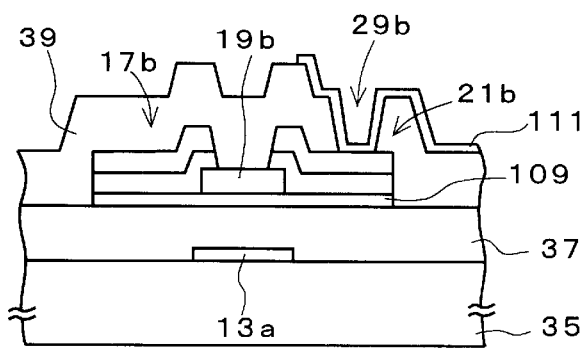
FIGS. 10A and 10B are sectional views showing steps in the method of manufacturing the liquid crystal display device (example 1) according to the first embodiment of the present invention.
Figure 10B:
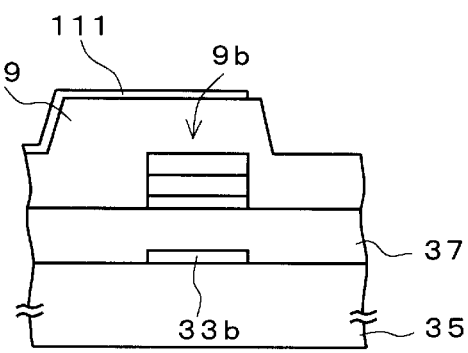

Then, as shown in FIGS. 10A and 10B, a pixel electrode material 111 of ITO for example is formed on the whole surface of the transparent glass substrate 35. Then, using a fifth mask, the pixel electrode material 111 is patterned to form a pixel electrode 27b having a prescribed shape as shown in FIG. 4. The pixel electrode 27b is electrically connected with the source electrode 21b through the contact hole 29b. As will be detailed, the pixel electrode 27 and the storage capacitor electrode 25 are also electrically connected through a contact hole 31, i.e., the opening formed in the protection film 39. Through the steps described above, the liquid crystal display device as shown in FIG. 4 is completed.

EXAMPLE 2

Figure 11:
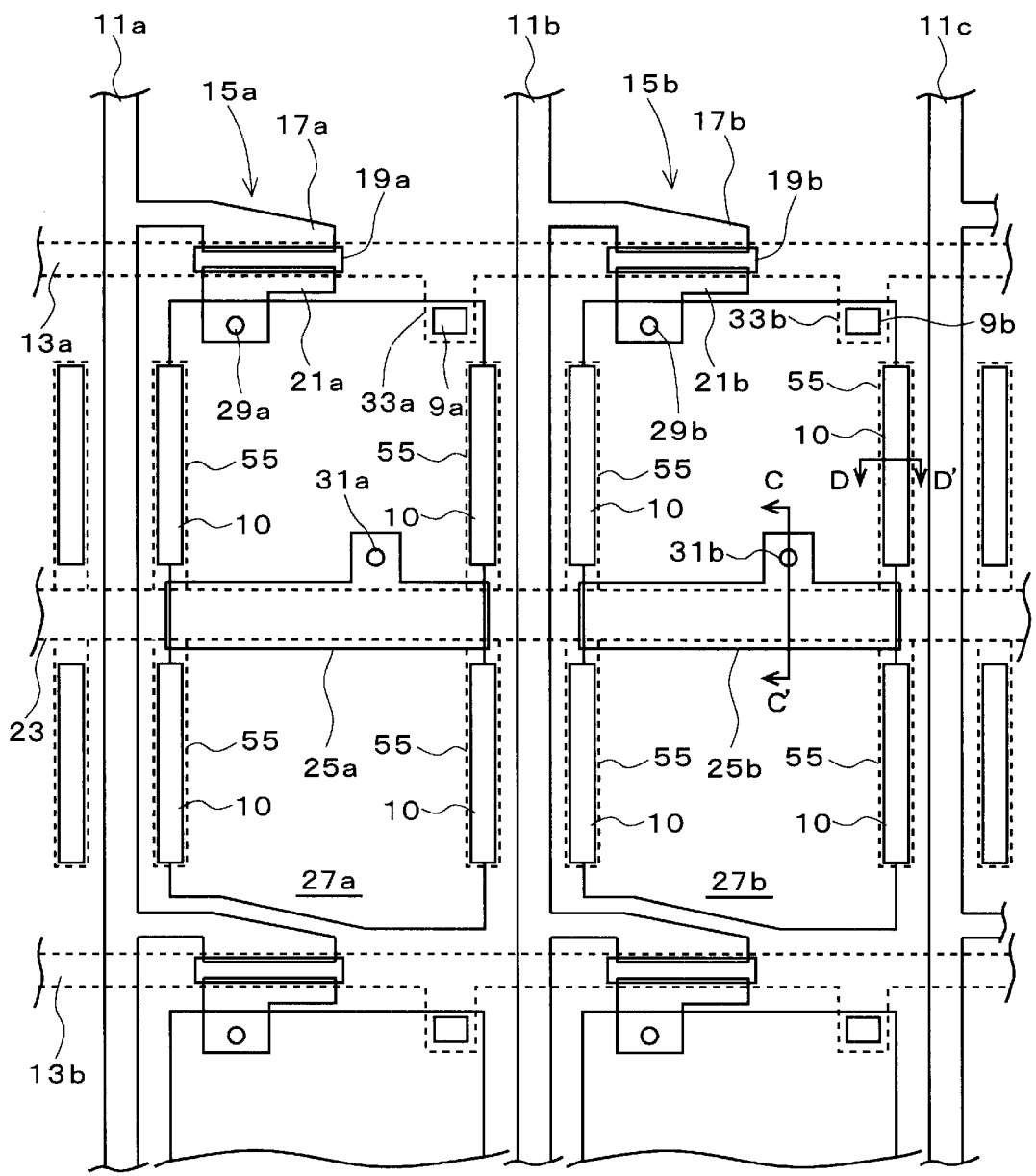
FIG. 11 is a plan view for use in illustration of a liquid crystal display device (example 2) according to the first embodiment of the present invention.

FIG. 11 is a plan view of a liquid crystal display device according to example 2 in this embodiment. FIG. 11 shows the surface of an array substrate viewed from the side of liquid crystal layer. The liquid crystal display device according to this example includes a lead-out portion 55 at the storage capacitor bus line 23 in the structure according to example 1 (FIG. 4). The lead-out portions 55 are formed as they are led out in a considerable length from both side ends of the storage capacitor bus line 23 at the sides of the pixel electrodes 27a and 27b in the horizontal direction. As a result, four lead-out portions 55 are formed in each pixel region, and an intermediate conductive layer 10 is provided almost on the entire region of each of the lead-out portions 55. The intermediate conductive layer 10 is formed in the manner as shown in FIGS. 12A to 17B. Thus, disconnection portions caused at the gate bus lines 13a, 13b, etc. as well as those caused at the storage capacitor bus lines can be repaired with a high success rate.

FIGS. 12A to 17B are sectional views showing steps in a method of manufacturing the liquid crystal display device according to this example. Note that in FIGS. 12A to 17B, elements the same as those shown in FIG. 11 are denoted with the same reference characters. FIGS. 12A, 13A, 14A, 15A, 16A and 17A show sections of the storage capacitor bus line 23 taken along line C–C' in FIG. 11, while FIGS. 12B, 13B, 14B, 15B, 16B and 17B show sections of a region including the intermediate conductive layer 10 taken along line D–D' in FIG. 11.

Figure 12A:
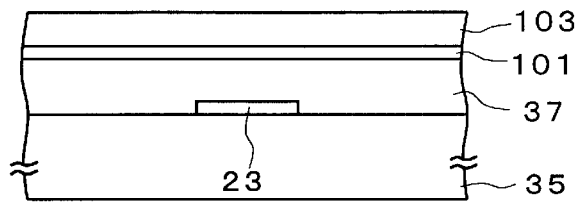
FIGS. 12A and 12B are sectional views showing steps in a method of manufacturing the liquid crystal display device (example 2) according to the first embodiment of the present invention.
Figure 12B:
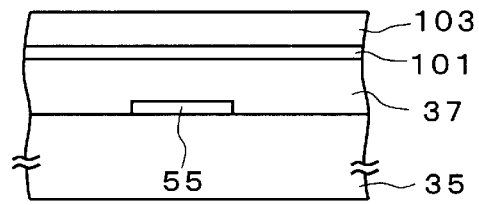

As shown in FIGS. 12A and 12B, an Al (aluminum) film for example is formed on the whole surface of the transparent glass substrate 35 to form a metal layer about as thick as 150 nm. Then, using a first mask, patterning is performed to form the storage capacitor bus line 23 (see FIG. 12A) and the lead-out portion 55 (see FIG. 12B) simultaneously with the formation of the gate bus line 13. Then, for example, a silicon nitride (SiN) film is formed on the whole surface of the substrate by plasma CVD to form a gate insulating film 37. An amorphous silicon (a-Si) layer 101 for example to form an active semiconductor film for a TFT is formed on the whole surface of the substrate by plasma CVD. Then, a silicon nitride film (SiN) 103 for example to form a channel protection film is formed on the whole surface by plasma CVD.

Figure 13A:
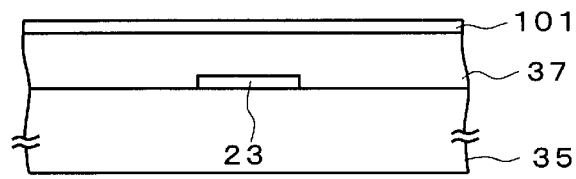
FIGS. 13A and 13B are sectional views showing steps in the method of manufacturing the liquid crystal display device (example 2) according to the first embodiment of the present invention.
Figure 13B:
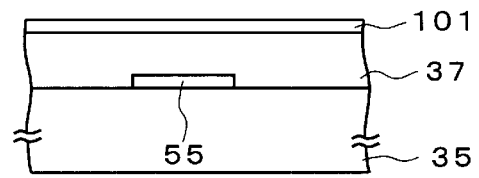

Then, the silicon nitride film 103 formed on the storage capacitor bus line 23 and the lead-out portion 55 is etched away (see FIGS. 13A and 13B).

Figure 14A:
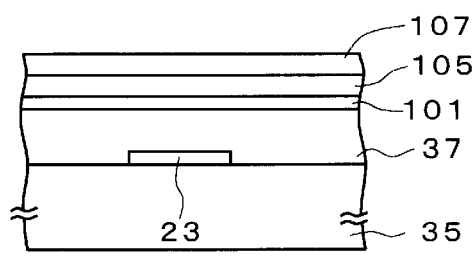
FIGS. 14A and 14B are sectional views showing steps in the method of manufacturing the liquid crystal display device (example 2) according to the first embodiment of the present invention.
Figure 14B:
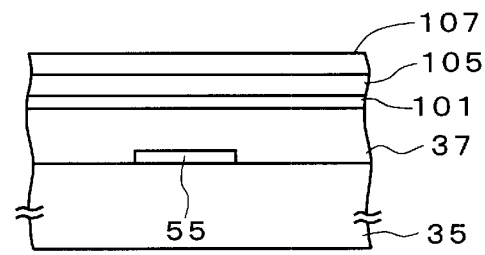

As shown in FIGS. 14A and 14B, an $n^+$a-Si layer 105 to form an ohmic contact layer for the source/drain electrodes for a TFT is formed on the whole surface by plasma CVD.

Then, a metal (such as Cr) layer 107 to form a storage capacitor electrode 25b and the intermediate conductive layer 10 is formed by sputtering.

Figure 15A:
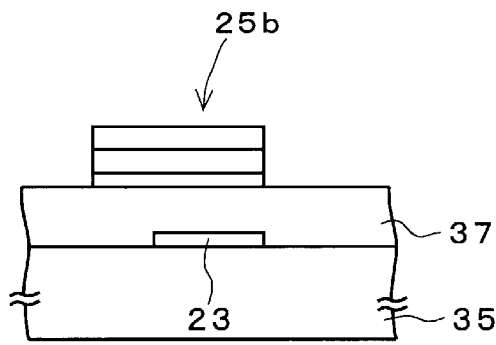
FIGS. 15A and 15B are sectional views showing steps in the method of manufacturing the liquid crystal display device (example 2) according to the first embodiment of the present invention.
Figure 15B:
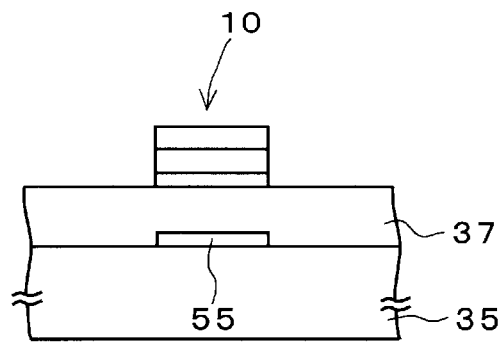

Then, as shown in FIGS. 15A and 15B, the metal layer 107, the $n^+$a-Si layer 105 and the amorphous silicon layer 101 are patterned to form the storage capacitor electrode 25b and the intermediate conductive layer 10.

Figure 16A:
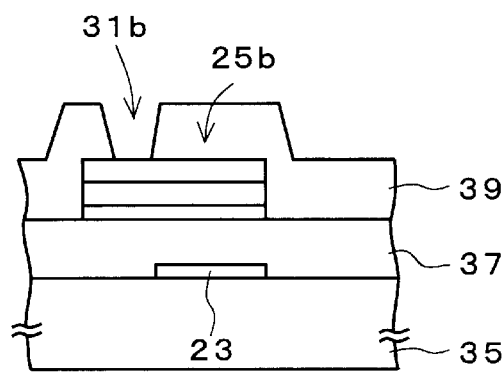
FIGS. 16A and 16B are sectional views showing steps in the method of manufacturing the liquid crystal display device (example 2) according to the first embodiment of the present invention.
Figure 16B:
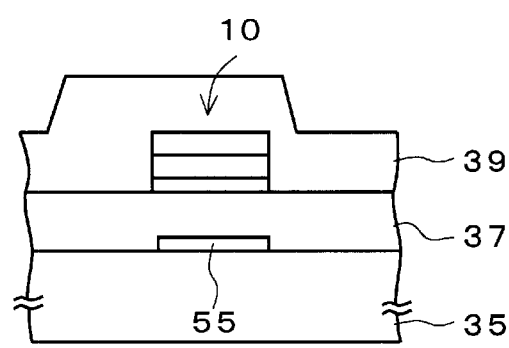

As shown in FIGS. 16A and 16B, a protection film 39 of a silicon nitride film for example is formed by plasma CVD. The protection film 39 is then patterned to form an opening in the protection film 39 on the storage capacitor electrode 25b and a contact hole 31b is formed on the storage capacitor electrode 25b.

Figure 17A:
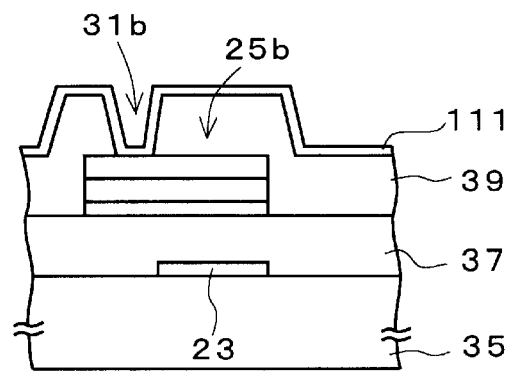
FIGS. 17A and 17B are sectional views showing steps in the method of manufacturing the liquid crystal display device (example 2) according to the first embodiment of the present invention.
Figure 17B:
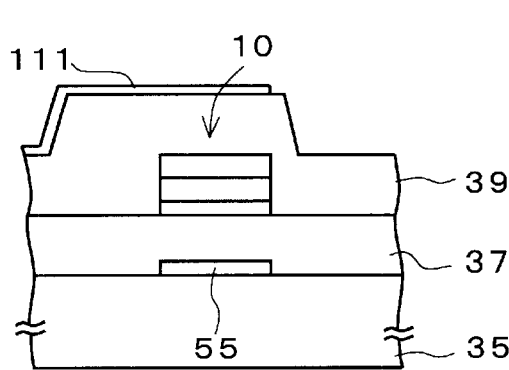

Then, as shown in FIGS. 17A and 17B, a pixel electrode material 111 of ITO for example is formed on the whole surface of the transparent glass substrate 35. The pixel electrode material 111 is then patterned to form a pixel electrode 27b having a prescribed shape as shown in FIG. 11. The pixel electrode 27b is electrically connected with the storage capacitor electrode 25b through the contact hole 31b. The liquid crystal display device as shown in FIG. 11 is completed through the steps as described above.

EXAMPLE 3

Figure 18:
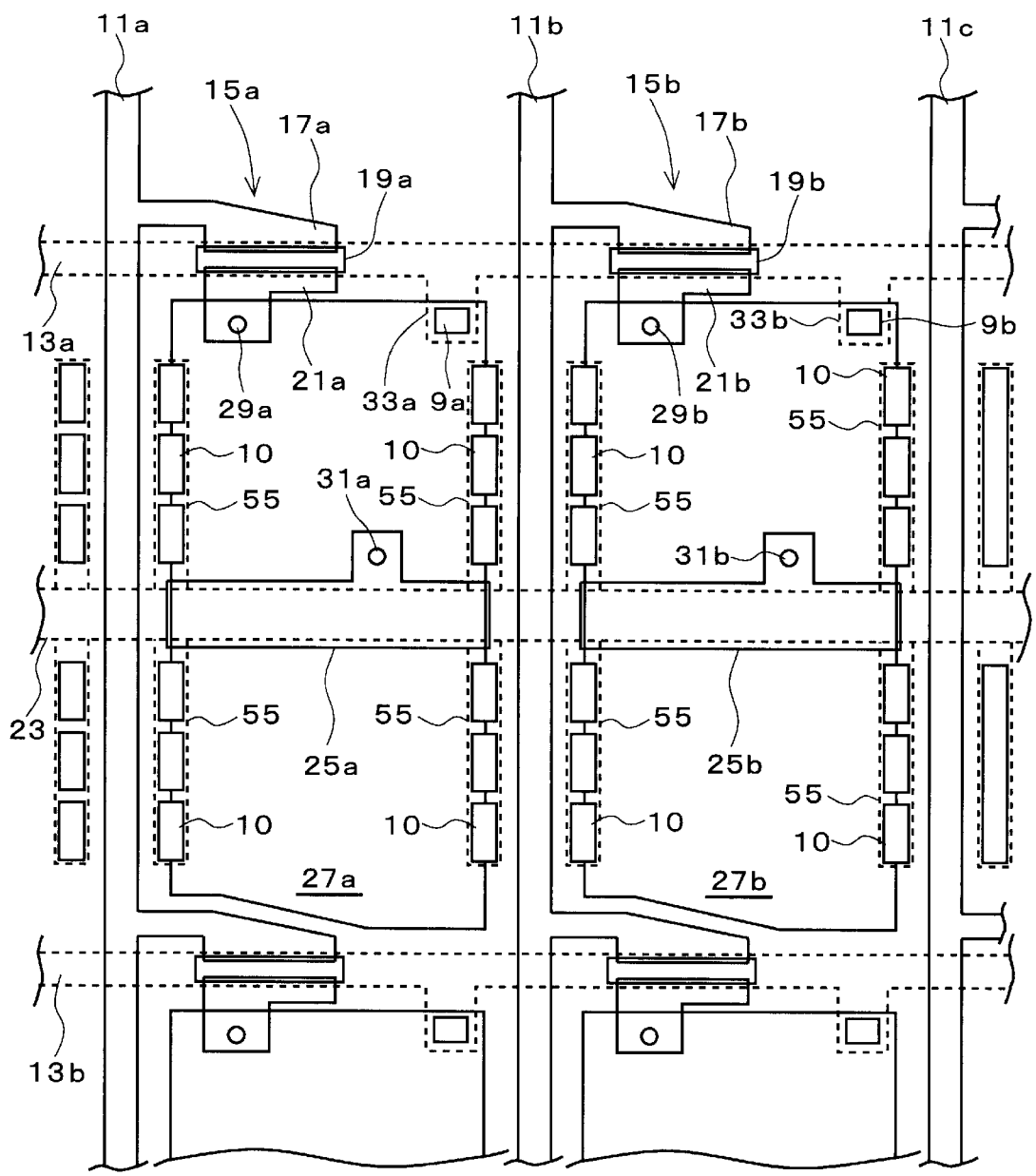
FIG. 18 is a plan view showing a liquid crystal display device (example 3) according to the first embodiment of the present invention.

A liquid crystal display device according to example 3 will be now described in conjunction with FIG. 18. FIG. 18 shows the surface of an array substrate viewed from the liquid crystal layer side. As shown in FIG. 18, the liquid crystal display device according to this example has a lead-out portion 55 at a storage capacitor bus line 23 similarly to example 2. The lead-out portion 55 is formed in the same manner as that in example 2. According to this example, intermediate conductive layers 10 are formed in a scattered manner in island shapes on the whole region of the lead-out portion 55. The intermediate conductive layer 10 is formed through the steps shown in FIGS. 12A to 17B described in connection with example 2. Thus, similarly to example 2, disconnection portions caused at gate bus lines 13a, 13b, etc. as well as those caused at the storage capacitor bus lines 23 can be repaired with a high success rate.

Next, modifications of the liquid crystal display device and the defect repairing method therefor according to the first embodiment will be now described. In the first embodiment described above, one TFT 15 is formed for each pixel, while a redundant structure may be employed in which for example two TFTs may be provided for each pixel. In that case, two lead-out portions 33 may also be formed for each pixel.

As a defect repairing method, first, one TFT 15 and one lead-out portion 33 are used to repair a disconnection at a gate bus line 13. Then, laser is irradiated to divide a pixel electrode 27 into a region surrounding the TFT 15 and the lead-out portion 33 and a region including the other TFT. The other TFT 15 may be used as a switching element to drive the pixel electrode 27, so that the pixel subjected to the defect repairing may be used for image display rather than being made into a dot defect.

Figure 19A:
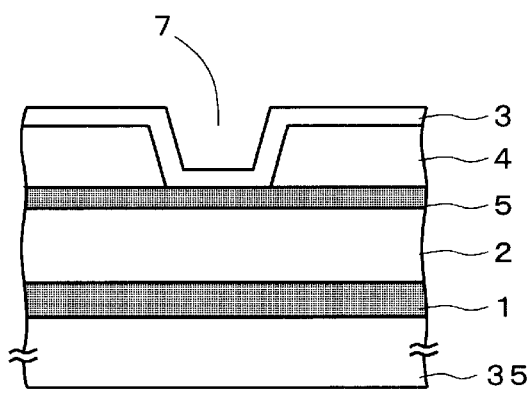
FIGS. 19A and 19B are sectional views for use in illustration a method of repairing a defect in a liquid crystal display device according to a second embodiment of the present invention.

Next, a liquid crystal display device and a defect repairing method therefor according to a second embodiment of the present invention will be now described in conjunction with FIGS. 19A to 26B. FIGS. 19A and 19B are sectional views for use in illustration of a method of repairing a defect in a liquid crystal display device according to the embodiment. As shown in FIG. 19A, the liquid crystal display device according to the embodiment has a contact hole 7 previously formed in a protection film 4, and an intermediate conductive layer 5 is electrically connected with a pixel electrode 3 through the contact hole 7.

Figure 19B:
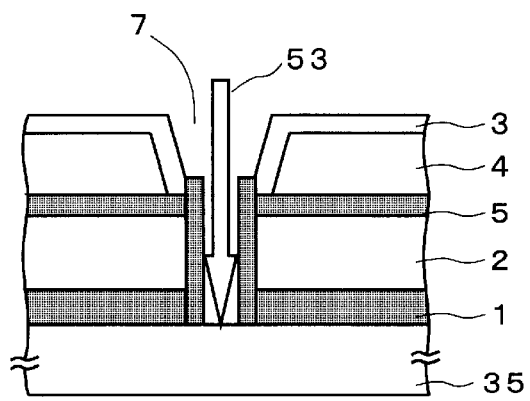

As shown in FIG. 19B, a laser beam 53 is irradiated to the center or the vicinity of the center of the contact hole 7 in order to connect the intermediate conductive layer 5 and the lowermost layer bus line 1. Thus, the upper layer pixel electrode 3 is previously electrically connected with the isolated intermediate conductive layer 5, so that the contact hole 7 can be irradiated by a single irradiation process for the connection.

Figure 20:
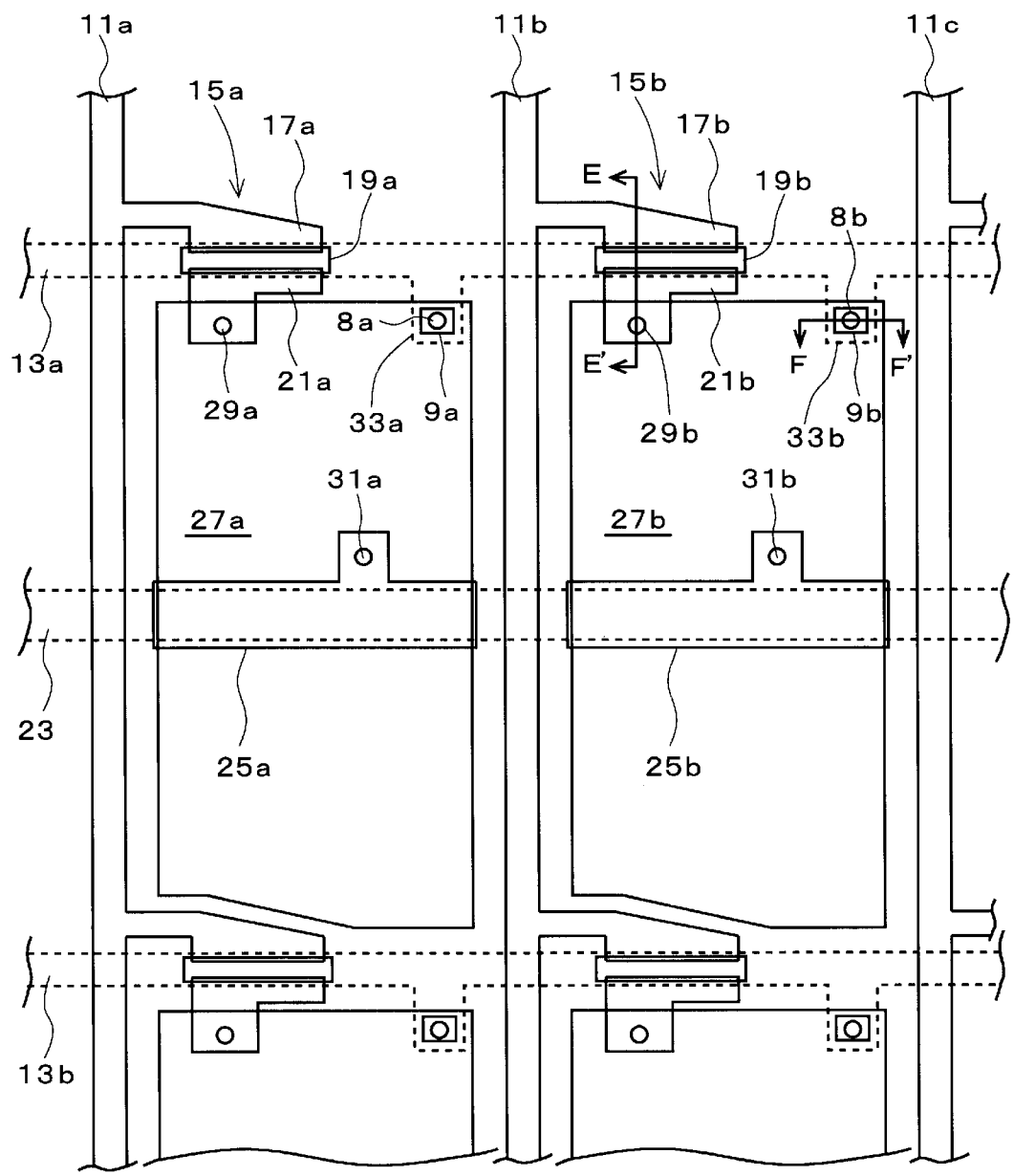
FIG. 20 is a plan view showing the liquid crystal display device according to the second embodiment of the present invention.
Figure 21A:
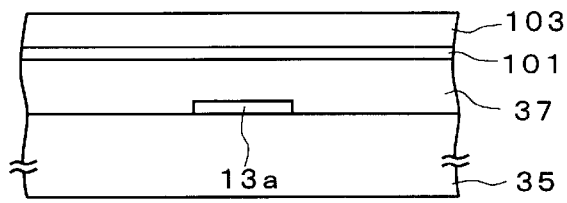
FIGS. 21A and 21B are sectional views showing steps in a method of manufacturing the liquid crystal display device according to the second embodiment of the present invention.
Figure 21B:
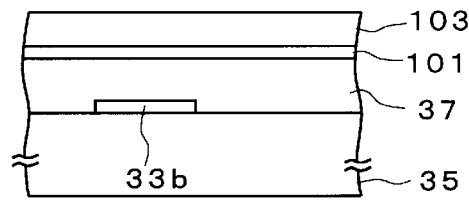
Figure 22A:
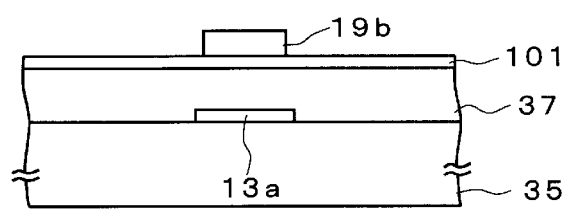
FIGS. 22A and 22B are sectional views showing steps in the method of manufacturing the liquid crystal display device according to the second embodiment of the present invention.
Figure 22B:
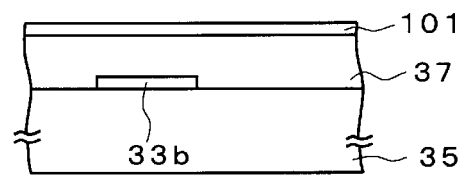
Figure 23A:
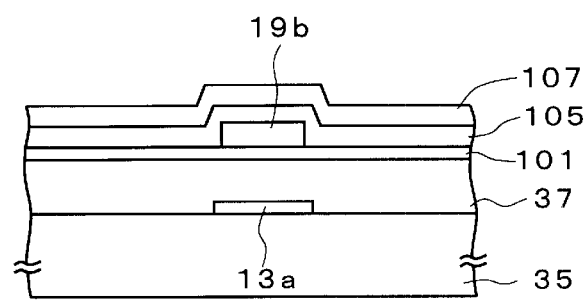
FIGS. 23A and 23B are sectional views showing steps in the method of manufacturing the liquid crystal display device according to the second embodiment of the present invention.
Figure 23B:
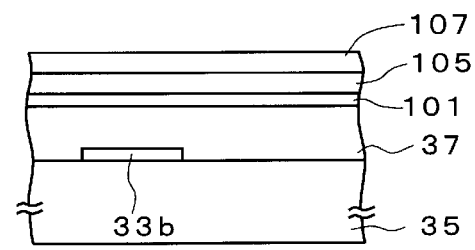
Figure 24A:
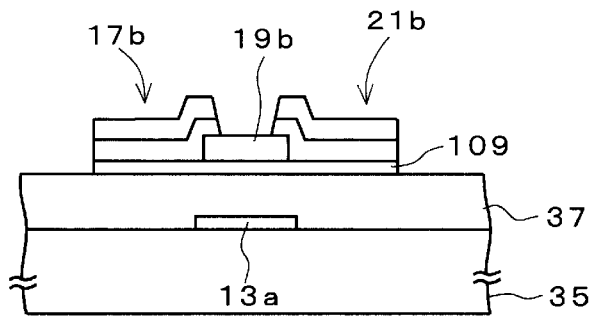
FIGS. 24A and 24B are sectional views showing steps in the method of manufacturing the liquid crystal display device according to the second embodiment of the present invention.
Figure 24B:
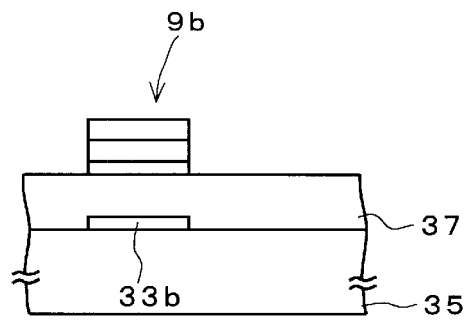

A liquid crystal display device of an inverted staggered type TFT and a manufacturing method thereof according to the embodiment will be now described in conjunction with FIGS. 20 to 26B. FIG. 20 is a plan view for use in illustration of the liquid crystal display device according to the embodiment. FIG. 20 shows the surface of an array substrate viewed from the liquid crystal layer side. This embodiment is an example of application to example 1 in the first embodiment (see FIG. 4). More specifically, as shown in FIG. 20, contact holes 8a, 8b are formed in intermediate conductive layers 9a, 9b provided in respective overlapping regions of lead-out portions 33a, 33b and pixel electrodes 27a, 27b when viewed in the normal direction to the panel surface. The intermediate conductive layers 9a, 9b and the contact holes 8a, 8b are formed as shown in FIGS. 21A to 26B. Thus, disconnection portions caused at gate bus lines 13a, 13b, etc. can be repaired with a high success rate.

FIGS. 21A to 26B are sectional views showing steps in the method of manufacturing the liquid crystal display device according to this embodiment. Note that in FIGS. 21A to 26B, the same elements as those shown in FIG. 20 are denoted with the same reference characters. FIGS. 21A, 22A, 23A, 24A, 25A and 26A show sections of the TFT 15b taken along line E–E' in FIG. 20, while FIGS. 21B, 22B, 23B, 24B, 25B and 26B show sections of the intermediate conductive layer 9b and the contact hole 8b taken along line F–F' in FIG. 20.

The steps in the method of manufacturing the TFT shown in FIGS. 21A, 22A, 23A, 24A, 25A and 26A are the same as those shown in FIGS. 5A, 6A, 7A, 8A, 9A, and 10A. Meanwhile, among the steps in the method of manufacturing the intermediate conductive layer shown in FIGS. 21B, 22B, 23B, 24B, 25B and 26B, those shown in FIGS. 21B, 22B, 23B and 24B are the same as those shown in FIGS. 5B, 6B, 7B, and 8B. Therefore, the steps the same as the manufacturing steps already described are not detailed, and the steps shown in FIGS. 25A to 26B will be described in conjunction with these figures.

Figure 25A:
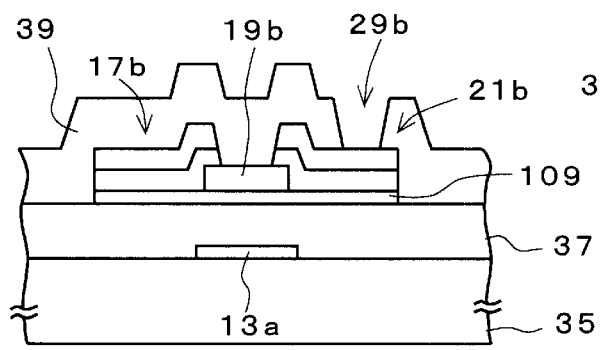
FIGS. 25A and 25B are sectional views showing steps in the method of manufacturing the liquid crystal display device according to the second embodiment of the present invention.
Figure 25B:
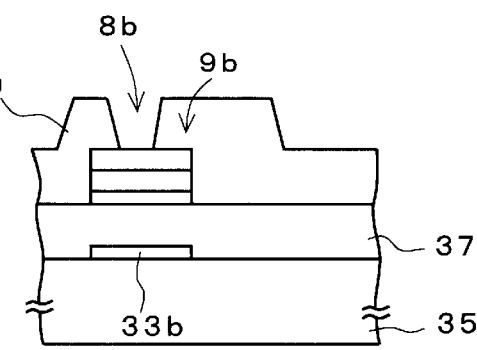

As shown in FIGS. 25A and 25B, a protection film 39 of a silicon nitride film for example is formed by plasma CVD. The protection film 39 is then patterned to form an opening in the protection film 39 on a source electrode 21b and an intermediate conductive layer 9b, so that a contact hole 29b is formed on the source electrode 21b and a contact hole 8b is formed on the intermediate conductive film 9b.

Figure 26A:
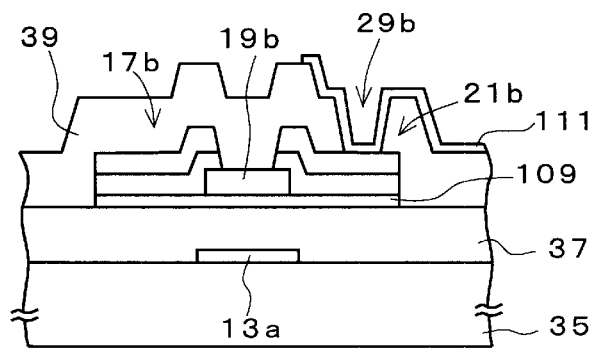
FIGS. 26A and 26B are sectional views showing steps in the method of manufacturing the liquid crystal display device according to the second embodiment of the present invention.
Figure 26B:
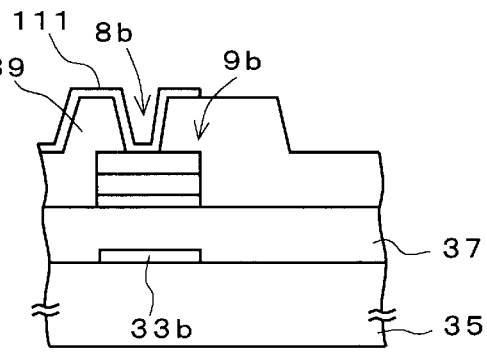

Then, as shown in FIGS. 26A and 26B, a pixel electrode material 111 of ITO for example is formed into a film on the whole surface of a transparent glass substrate 35. Then, the pixel electrode material 111 is patterned to form a pixel electrode 27b having a prescribed shape as shown in FIG. 20. The pixel electrode 27b is electrically connected with the source electrode 21b through the contact hole 29b, and is also electrically connected with the intermediate conductive layer 9b through the contact hole 8b. Through the above-described steps, the liquid crystal display device as shown in FIG. 20 is completed.

Note that this embodiment is by all means similarly applicable to examples 2 and 3 in the first embodiment. The intermediate conductive layers 9a, 9b and 10 are formed using a metal layer 107 to form the drain electrodes 17a, 17b, the source electrodes 21a, 21b and the like. This method does not require an additional step of placing an intermediate conductive layer. This however does not exclude the possibility of separately forming an intermediate conductive layer using a metal oxide film.

Next, a method of repairing a defect in a liquid crystal display device according to a third embodiment of the present invention will be now described. When a disconnection is caused at a disconnection portion 41 shown in FIG. 27 for example, a laser beam is irradiated upon a laser irradiation position 43 to provide an opening. Then, a colloidal solution containing dispersed metal particles is applied to the vicinity of the opening. Then, a laser beam is again irradiated upon the opening to allow the metal to be deposited. The deposited metal connects the pixel electrode 27b and the lead-out portion 33b to repair the disconnection. According to this repairing method, the conventional manufacturing method can be performed without changes.

The present invention is not limited to the above-described embodiments and may be subjected to various modifications. For example, in the described embodiments, the intermediate conductive layer is provided at the pixel portion, while it may be applied to parts other than the display portion such as a terminal portion.

As in the foregoing, according to the present invention, a liquid crystal display device which allows disconnection defects caused in the process of manufacturing the liquid crystal display device to be readily repaired with a higher success rate than conventional cases, so that the device can be modified into a non-defective device, and a defect repairing method therefor may be implemented. Also in the above-described liquid crystal display device according to the present invention, the intermediate conductive layer is electrically connected with the pixel electrode through a contact hole formed in an insulating layer provided immediately above. According to the present invention, the bus line, the intermediate conductive layer and the pixel electrode can be connected at a time by a single laser beam irradiation process, and therefore the repair success ratio can be further improved.

In addition, in the above-described liquid crystal display device according to the present invention, the intermediate conductive layer is formed of a thin film having a single or multi-layer structure, and includes at least a metal film or a metal oxide film. In the case of a metal film, the number of manufacturing steps is not increased, while in the case of a metal oxide film, increase in the number of manufacturing steps can be small.

The above-described object of the present invention is achieved by a defect repairing method of repairing a disconnection defect in a liquid crystal display device caused at a bus line formed on a substrate and the method includes a first step of irradiating a laser beam upon a pixel electrode and an intermediate conductive layer formed in an insulating film at an under layer of the pixel electrode, thereby electrically connecting the pixel electrode and the intermediate conductive layer, and a second step of irradiating a laser beam upon the intermediate conductive layer and a lead-out portion led out from the bus line and extending at an under layer of the intermediate conductive layer through an insulating film, thereby electrically connecting the intermediate conductive layer and the lead-out portion.

According to the present invention, the intermediate conductive layer and the pixel electrode are connected and the intermediate conductive layer and the lowermost bus line are connected, so that the repair success rate is improved as compared to conventional cases.

Also in the method of repairing a defect in a liquid crystal display device according to the present invention, in the second step, a slit having a narrower width than a slit formed by the laser beam irradiation in the first step is formed. According to the present invention, since the width of a laser beam slit used for connecting the intermediate conductive layer and the lowermost bus line is narrower than that in the case of connecting the intermediate conductive layer and the pixel electrode, so that a further increase may be expected for the repair success rate.

What is claimed is:

1. A liquid crystal display device, comprising:
    a lead-out portion led out from a bus line formed on a substrate and extending at an under layer of a pixel electrode through an insulating film; and
    an isolated intermediate conductive layer formed in said insulating film between said lead-out portion and said pixel electrode.

2. The liquid crystal display device according to claim 1, wherein
    said intermediate conductive layer is electrically connected with said pixel electrode through a contact hole formed in an insulating layer positioned immediately above.

3. The liquid crystal display device according to claim 1, wherein
    said intermediate conductive layer is formed of a thin film having a single or multi-layer structure, and includes at least a metal film or a metal oxide film.

4. A method of repairing a defect in a liquid crystal display device, said method repairing a disconnection defect caused at a bus line formed on a substrate, comprising:
    a first step of irradiating a laser beam upon a pixel electrode and an intermediate conductive layer formed in an insulating film at an under layer of said pixel electrode, thereby electrically connecting said pixel electrode and said intermediate conductive layer; and
    a second step of irradiating a laser beam upon said intermediate conductive layer and a lead-out portion led out from said bus line and extending at an under layer of said intermediate conductive layer, thereby electrically connecting said intermediate conductive layer and said lead-out portion.

5. The method of repairing a defect in a liquid crystal display device according to claim 4, wherein
    in said second step, a slit having a narrower width than a slit formed by the laser beam irradiation in said first step is formed.

* * * * *